United States Patent [19]
Auld

[11] 3,882,408
[45] May 6, 1975

[54] PARAMETRIC ACOUSTIC SURFACE WAVE AMPLIFIER

[75] Inventor: Bertram A. Auld, Menlo Park, Calif.

[73] Assignee: Stanford University, Stanford, Calif.

[22] Filed: May 18, 1973

[21] Appl. No.: 361,788

[52] U.S. Cl. .................................. 330/5.5; 330/4.6
[51] Int. Cl. ............................................. H03f 7/04
[58] Field of Search .................................... 330/5.5

[56] References Cited

OTHER PUBLICATIONS

Chao, "Applied Physics Letters", 15 May 1970, pp. 399–401.

*Primary Examiner*—R. V. Rolinec
*Assistant Examiner*—Darwin R. Hostetter
*Attorney, Agent, or Firm*—Paul B. Fihe

[57] ABSTRACT

A parametric acoustic surface wave amplifier which includes a pair of transducers located on an acoustic surface wave propagating medium at predetermined positions and coupled to phase-related pump signal generators to effect parametric amplification and reradiation of an amplified signal wave in only one direction.

2 Claims, 2 Drawing Figures

PARAMETRIC ACOUSTIC SURFACE WAVE AMPLIFIER

FIELD OF THE INVENTION

The present invention relates generally to parametric amplifiers and more particularly to a parametric acoustic surface wave amplifier.

BACKGROUND OF THE INVENTION

As mentioned in the general review article in the October, 1972 issue of SCIENTIFIC AMERICAN, acoustic surface waves are being investigated for a wide variety of applications. In particular, because of their slow velocity as compared to electromagnetic waves, an intensive investigation of the use of acoustic surface waves in delay lines and related information storage devices is occurring.

In common with other energy propagating techniques, attenuation losses are encountered in all the devices and as a consequence a number of amplification mechanisms have been developed to overcome such losses so the desired signal will remain at an amplitude level unobscured by existent acoustic or electrical "noise."

SUMMARY OF THE PRESENT INVENTION

It is the general objective of the present invention to provide an effective parametric amplifier for acoustic surface waves.

In accordance with this objective, an input signal which is to be amplified is delivered through a suitable electro-acoustic transducer on a piezoelectric crystal or other acoustic surface wave propagating medium so as to travel therealong in a predetermined path towards a similar output transducer which reconverts the acoustic signal into an electromagnetic output signal. Along the path between the input and output transducers, an additional pair of electro-acoustic transducers are associated with the propagating medium and are electrically connected to separate sources of pump signals in a fashion, to parametrically interact with the propagating acoustic input signal to effect amplification thereof. The relative phase of the pump signals and the position of the pair of transducers on the propagating medium are arranged so that the amplified energy in the original direction of propagation is additive whereas to the contrary, in the opposite direction the so-called reflected wave energy of the two transducers cancels. Thus, only parametrically amplified energy is delivered to the output transducer and no reflected "echoes" are delivered to the input signal transducer.

BRIEF DESCRIPTION OF THE DRAWING

The stated objective of the invention and the manner in which it is achieved as summarized hereinabove will be more readily understood by a perusal of the following detailed description of an exemplary embodiment of the invention shown in the accompanying drawing wherein.

DETAILED DESCRIPTION OF THE EXEMPLARY EMBODIMENT OF THE INVENTION

Figure 1:
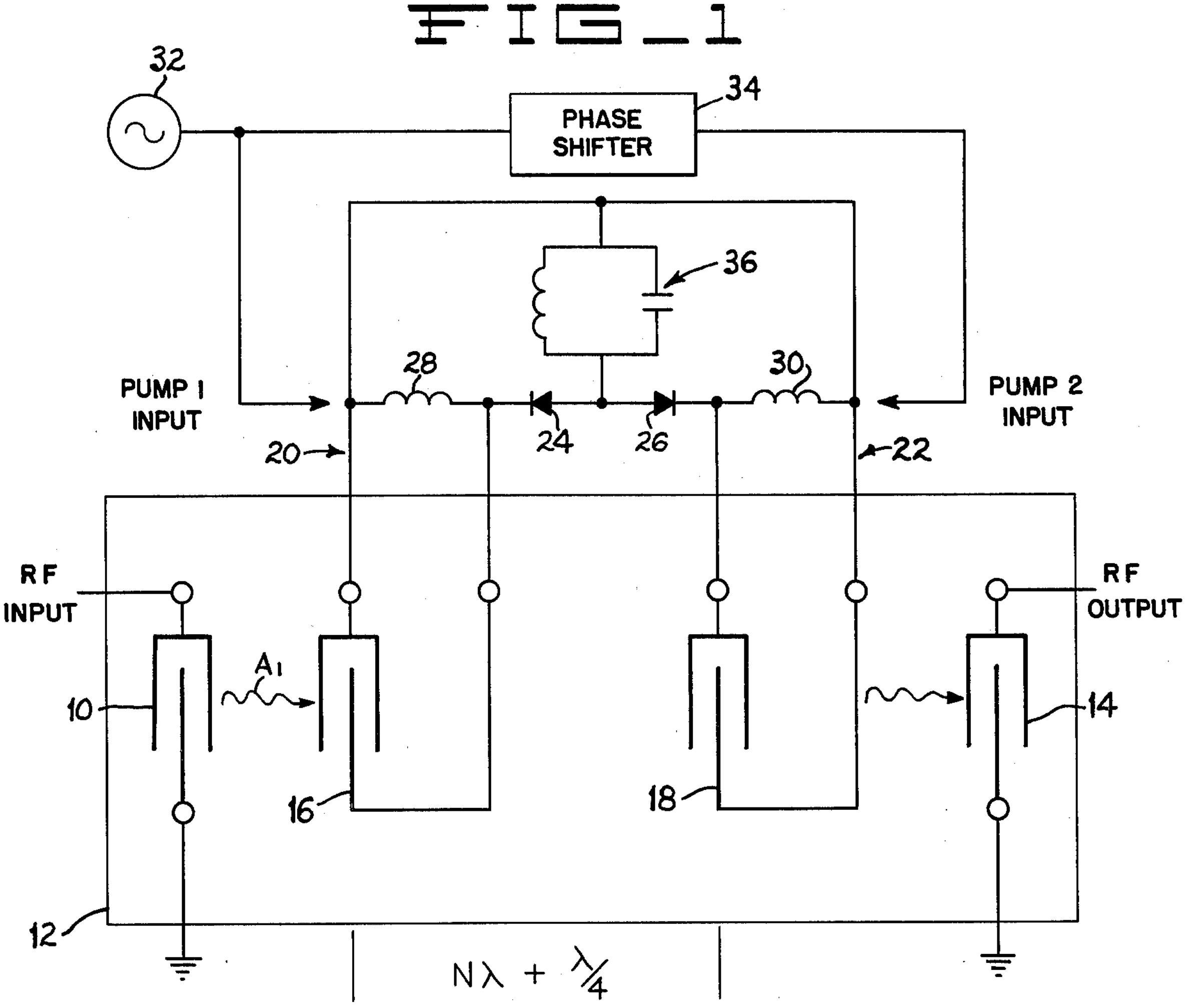
FIG. 1 is a diagrammatic plan view of an acoustic surface wave parametric amplifier embodying the present invention.

With initial reference to FIG. 1 a radio frequency signal, for example at a frequency of 100 MHz, is delivered to an input interdigital transducer 10 of standard design applied to the surface of an acoustic wave propagating medium 12 so as to propagate to the right, as viewed in FIG. 1, as indicated by the wavy arrow $A_1$. As is well known in the art, the propagating medium preferably takes the form of a piezoelectric crystal such as lithium niobate, and in such case the optimum propagating direction of the crystal is selected.

At the opposite end of the crystal 12, an output interdigital transducer 14 of similar design is disposed to receive and convert the acoustic waves into output radio frequency energy.

In accordance with the present invention, parametric amplification of the propagating acoustic surface wave occurs between the input and output transducers 10, 14 and for this purpose, a pair of interdigital transducers 16, 18 are positioned on the propagating medium with a spacing therebetween of an integral number of acoustic wavelengths plus an additional quarter wavelength ($N\lambda + \frac{1}{4}\lambda$). Therefore, excitation of the second transducer 18 by the propagating signal wave will be displaced by 90° in phase from the signal excitation of the first transducer 16.

Both these transducers 16, 18 are connected to similar exterior signal circuits 20, 22 connected to corresponding variable reactance diodes 24, 26, inductors 28, 30, and the capacitance presented by the interdigital transducers 16, 18 so as to form circuits tuned to the frequency of the signal wave (e.g., 100 MHz). Because of the noted spacing of the two transducers 16, 18, the signal excitation of the two signal circuits 20, 22 will, of course, be 90° out of phase.

Separate pump signals are delivered to the two variable reactance diodes 24, 26 in accordance with the present invention. A single signal generator 32, preferably operating at a higher frequency of, for example, 210 MHz, is arranged to deliver power directly to the one variable reactance diode 24 and through a 90° phase shifter 34 to the second variable reactance diode 26. The diodes 24, 26, in addition to their connection in the separate signal circuits 20, 22, as described hereinabove, are connected in series in a separate idler circuit 36 that is tuned to the difference frequency of the pump and signal waves, thus providing for parametric interaction of the pump and signal waves. Such parametric interaction has been discussed generally in the volume, "Coupled Mode and Parametric Electronics" by W. Louisell (1960), and in connection with semiconductor diodes by Blackwell and Kotzebue in the volume, "Semiconductor-diode Parametric Amplifiers" (1961). More particularly, such interaction has been specifically explained in connection with acoustic surface waves in the article, "Parametric Amplification of Surface Acoustic Waves" by Chao in Applied Physics Letters, Vo. 16, No. 10, (May, 1970), to which reference is made for details of parametric amplifier theory.

In the present instance, because of the phase difference of the signal waves due to the spacing of the transducers and the phase difference of the two pump inputs resultant from the phase-shifting operation described hereinabove, the idler excitation at both of the variable reactance diodes 24, 26 will be in phase so that a net idler current will flow in the common idler circuit, whereby the mentioned parametric amplification will be produced.

As a consequence, both transducers 16, 18 will be electrically excited by an electromagnetic signal at a frequency constituting the difference between the pump and idler frequencies, but the signals at the two transducers will be reradiated at 90° phase difference. More particularly, the reradiation from the second transducer 18 will lag the reradiation from the first transducer 16 by 90° and again because of the spacing between the two transducers, the reradiated waves will add constructively so that an amplified transmitted signal as indicated by the wavy arrow $A_2$ will be delivered to the output transducer 14.

On the other hand, reflected waves, that is, those reradiated from the two transducers 16, 18 to the left, will be out of phase (180°) so that no net radiation to the left, or in other words towards the input transducer 10, will occur. Accordingly, amplification only in the forward or transmitted direction of the input wave will exist.

It can be observed in passing that a similar discussion of a wave traveling from right to left in the structure as shown in FIG. 1, given the same transducer spacing and the same phase relationship of the input pump signals, will not create a net idler current and no reradiated signals will be produced. Thus, no "echo signals" can arise in the operation of the described parametric amplifier and its use for example as a delay line is thus greatly enhanced.

Figure 2:
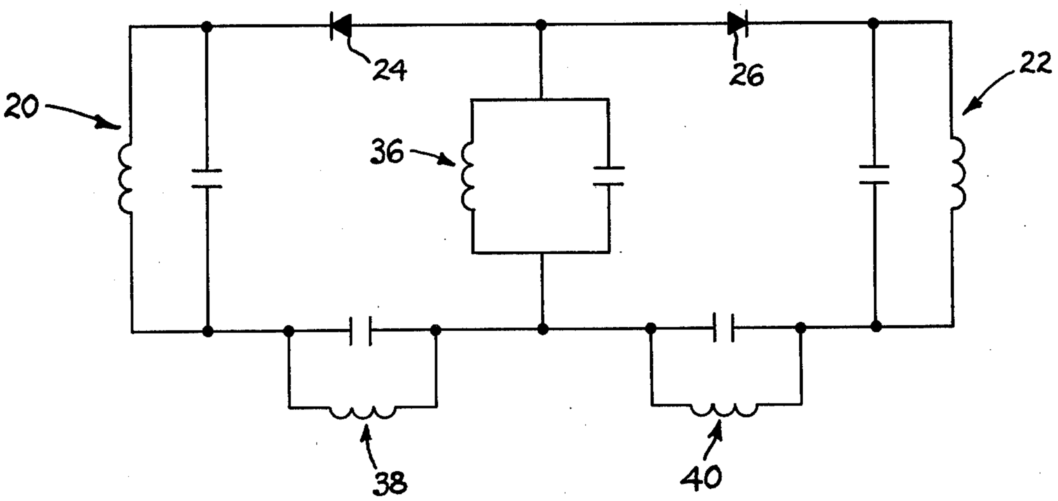
FIG. 2 is an explanatory equivalent circuit diagram thereof.

To facilitate understanding of the described apparatus and its operation, reference is additionally made to the equivalent circuit of FIG. 2 wherein the two signal circuits 20, 22 can be represented as separate resonant circuits tuned to the frequency of the signal wave, the capacitive component of the transducers 16, 18 being included in the representative capacities of these tuned circuits. In turn, the two separate pump circuits as indicated at 38, 40 can also be represented as resonant circuits tuned to the pump frequencies and these circuits as well as the variable reactance diodes 24, 26 are connected in a common central resonant circuit which forms the idler circuit 26, tuned, of course, to the difference between the pump and signal frequencies. It may be mentioned that the variable reactance diodes 24, 26 constitute variable capacitance components whose capacitance values are determined by the applied voltage. In the operation of the present apparatus, their values are primarily determined by the applied pump power which is considerably greater than that of the signal so that such value will not significantly change even with small changes in amplitude of the signals to be amplified.

Obviously various modifications and alterations in the described apparatus can be made without departing from the spirit of the invention, and the foregoing description of that embodiment accordingly is not be considered as limiting, and the actual scope of the invention is indicated only by reference to the appended claims.

What is claimed is:

1. A parametric acoustic surface wave amplifier which comprises an acoustic surface wave propagating medium, means for generating a signal acoustic surface wave to propagate along a predetermined path in said medium, means for generating two pump signals displaced in phase by 90° and having a predetermined frequency relationship to said signal wave to enable parametric interaction, and means including a pair of transducers connected to said pump signal generating means and positioned on said medium at positions spaced on odd number of one-quarter wavelengths along said predetermined path such that additive relation of acoustic waves reradiated at said transducers occurs.

2. A parametric acoustic surface wave amplifier according to claim 1 wherein said transducers are spaced by an integral number of wavelengths plus one-quarter wavelength.

* * * * *